United States Patent [19]

Coleman

[11] 4,247,881
[45] Jan. 27, 1981

[54] DISCOIDAL MONOLITHIC CERAMIC CAPACITOR

[75] Inventor: James H. Coleman, Wichita Falls, Tex.

[73] Assignee: Sprague Electric Company, North Adams, Mass.

[21] Appl. No.: 26,113

[22] Filed: Apr. 2, 1979

[51] Int. Cl.³ .............................................. H01G 4/42
[52] U.S. Cl. ................................... 361/302; 361/321; 361/329; 361/330
[58] Field of Search ................. 361/330, 329, 321, 302

[56] References Cited

U.S. PATENT DOCUMENTS

| | | |
|---|---|---|
| 2,922,936 | 1/1960 | Dehn . |
| 3,177,415 | 4/1965 | Kater . |
| 3,235,939 | 2/1966 | Rodriguez ..................... 361/321 X |
| 3,617,830 | 11/1971 | Perna ................................ 361/329 |
| 3,721,871 | 3/1973 | Heron ................................ 361/330 |
| 3,896,354 | 3/1975 | Coleman . |
| 4,148,003 | 4/1979 | Colburn ............................ 361/329 |

FOREIGN PATENT DOCUMENTS 1203391 10/1965 Fed. Rep. of Germany .......... 361/330
207267 1/1940 Switzerland ............................ 361/302

Primary Examiner—E. A. Goldberg
Attorney, Agent, or Firm—Connolly and Hutz

[57] ABSTRACT

A discoidal monolithic ceramic capacitor being terminated at a hole in the center and at the outer periphery thereof, includes concentric annular electrodes buried in a discoidal ceramic body and arranged to provide series connected equal value sub-capacitors to reduce dielectric stress and permit operation at high voltages. Misregistration of the concentric annular electrodes in one plane with respect to those in another plane may occur in manufacturing without disturbing the balance in the equal sub-capacitor values and thus even distribution of voltage stress in the ceramic dielectric.

4 Claims, 4 Drawing Figures

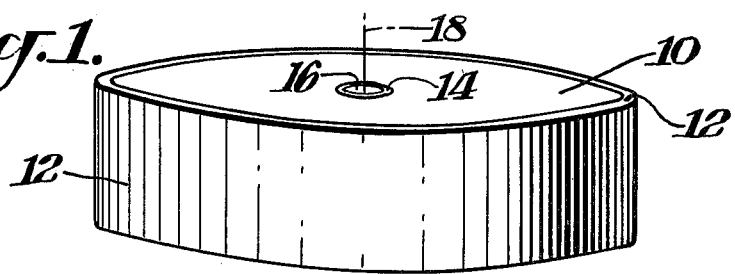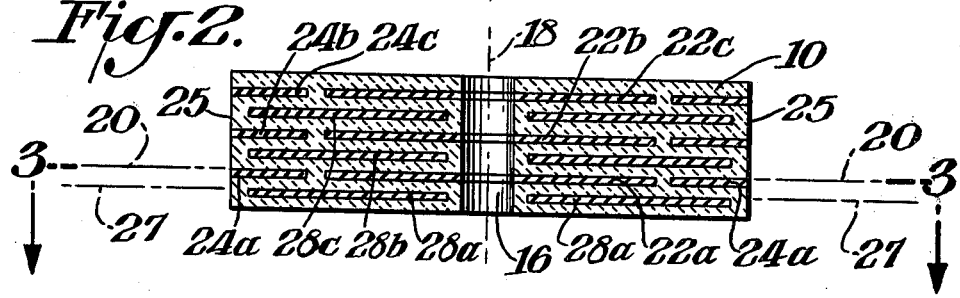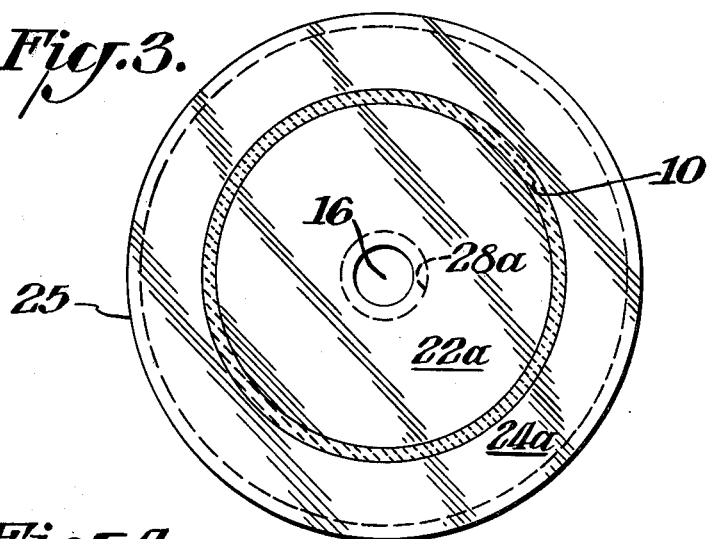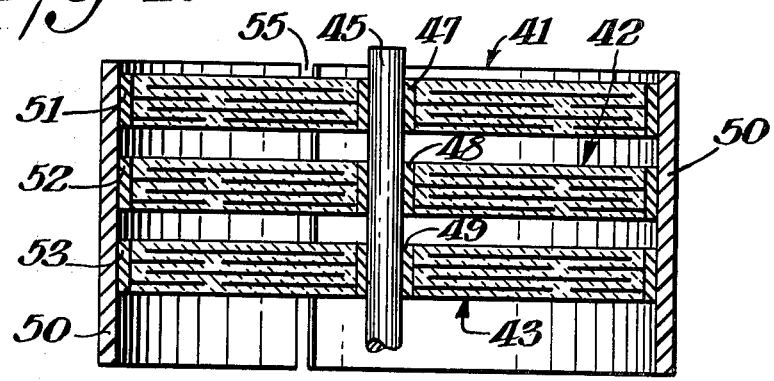

4,247,881

DISCOIDAL MONOLITHIC CERAMIC CAPACITOR

BACKGROUND OF THE INVENTION

This invention relates to a discoidal monolithic ceramic capacitor and more particularly to such a capacitor having at least one floating electrode and being suitable for use in high voltage circuits at high frequencies. Discoidal or cylindrical capacitors having coaxial terminals or leads are known to have good electrical properties at high frequencies and by extending the center lead in opposite directions away from the body, i.e. axially, this structure is particularly useful as a high frequency filtering feed-through capacitor.

In capacitors intended for use at high voltages, it is known to employ a floating electrode having an equal capacitive relationship with respect to two terminated electrodes. Such capacitors are in fact two series sub-capacitors, whereby the voltage across the dielectric layers is half that applied between the capacitor terminals. The dielectric stress can be reduced further by the employment of additional floating electrodes, effectively increasing the number of sub-capacitors in the series string between the terminals. Such floating electrodes always have a range of registration (mis-registration) positions with respect to the terminated electrodes due to the particular tools, controls, etc., that are a part of a given manufacturing process. In typical process steps for making monolithic ceramic capacitors it is not unusual for such electrode misregistrations to reach ±15%. In a series string of sub-capacitors, the capacitor with the lowest capacity drops the greatest voltage and is most prone to voltage breakdown. In the patent to Coleman and Lo, U.S. Pat. No. 3,896,354 issued July 22, 1975, and assigned to the same assignee as is the present invention, it is shown how the effect of such misregistrations in an X or Y direction may be essentially eliminated by providing the electrodes with oppositely disposed extended portions.

It is an object of the present invention to provide in a cylindrical monolithic ceramic capacitor floating annular electrodes having equal capacitive relationships with two other annular electrodes which equal relationships are essentially unaffected by electrodes misregistration in any direction.

It is a further object of this invention to provide a monolithic ceramic capacitor capable of high yields in manufacture and having seriesed sub-capacitors wherein the active dielectric layers experience a uniform voltage stress.

SUMMARY OF THE INVENTION

A monolithic ceramic capacitor has a cylindrical dielectric ceramic body with a hole that is concentric with the axis of the body. At least three circularly annular metal film electrodes are buried in the body and have increasingly greater diameters taken in order of their increasing outer positions. The adjacent of the electrodes overlap each other to form series connected sub-capacitors of substantially the same capacity between the innermost and outermost of the electrodes.

This is accomplished, for example, wherein among the buried electrodes, each electrode of a first set lying in a first plane has equal areas of overlap with the adjacent one or two adjacent of a second set of the electrodes lying in a second plane. Thus, misregistration of the electrodes in the first plane with respect to electrodes in the second plane, as may result in the step of screen printing the electrodes, causes no change in the capacitive relationship between an electrode of the second plane and each of the adjacent electrodes in the first plane. This is true no matter in what direction the misregistration occurs and is also true for rotation of the first plane electrodes with respect to the second plane electrodes.

A plurality of such capacitors may be stacked in an assembly including a central conductor in the holes of the capacitor bodies and an outer tubular conductor, the two conductors having a mutually coaxial relationship. This assembly with coaxial leads provides excellent high frequency performance, high voltage capability, and versatility with respect to the total capacity that can be achieved. It is particularly well suited for energy storage systems with fast discharge capability.

BRIEF DESCRIPTION OF THE DRAWING

FIG. 1 shows in perspective a cylindrical ceramic capacitor of this invention.

FIG. 2 shows in side sectional view the capacitor of FIG. 1 without the termination layers, the capacitor having been sectioned in a plane of the axis.

FIG. 3 shows in top sectional view the capacitor of FIG. 2 taken in plane 3—3.

FIG. 4 shows an assembly of three capacitors of this invention.

DESCRIPTION OF THE PREFERRED EMBODIMENTS

The capacitor of FIG. 1 has a cylindrical ceramic body 10 having one metal termination layer 12 on the outer circumferential surface of the body 10 and another metal termination layer 14 on the inner surface of a hole 16 in the body 10. The hole 16 is more clearly shown to be coaxial with the body axis 18 in FIG. 2.

With reference to FIGS. 2 and 3, the ceramic body 10 contains many buried electrode films. In plane 20 that is orthogonal to the axis 18, there is an inner film 22a extending to the hole 16 and an outer film 24a extending to the outer body surface or periphery 25. In plane 27 there is a floating electrode film 28a that does not extend to any of the body surfaces. The area of overlap between electrode films 28a and 24a is equal to the area of overlap between films 28a and 22a so that when a voltage is applied between films 22a and 24a, the voltage across the active ceramic layers which are sandwiched between films 28a and 24a and films 28a and 22a, respectively, are equal. Films 22b and 22c have the same pattern and area as those of film 22a; and films 24a, 24b and 24c as well as films 28a, 28b and 28c are similarly related.

Standard process steps are employed for making the capacitor illustrated in FIGS. 1, 2 and 3. Briefly, three green ceramic layers, have an electroding ink screen-printed on them in the pattern of electrode 28a as seen in FIG. 3. Also, an electroding ink pattern such as that of films 22a and 24a are screen printed on three additional green ceramic layers. These six layers are stacked so that the ink films produce a pattern in cross section as shown in FIG. 2 and an uninked green ceramic layer is laid over the stack. The seven layer stack is then fired to transform the ink patterns into metal electrode films and to mature the ceramic.

A conductive layer may then be applied to the surface of the hole to form the terminal layer 14 which is in electrical contact with the innermost electrode films 22a, 22b and 22c. Similarly, a conductive layer may be applied to the outer peripheral surface 25 of the fired ceramic body 10 to form the terminal layer 12 which is in contact with the outermost electrodes 24a, 24b and 24c.

A suitable ceramic for use in capacitors of this invention is described in the patent U.S. Pat. No. 4,027,209 to G. Maher issued May 31, 1977 and assigned to the same assignee as is the present invention. The terminal layers 12 and 14 may each consist of a sub-layer of silver and an over-layer of tin-lead alloy solder (not separately shown).

Each of the three capacitors 41, 42 and 43 in FIG. 4 include six electrode films but otherwise have the same structural features as those of the capacitor (with nine electrode films) illustrated in FIGS. 1, 2 and 3. A copper wire 45 is connected in the holes of capacitors 41, 42 and 43 to the inner terminal layers thereof 47, 48 and 49, respectively, by a reflow soldering step. A tubular outer copper sheet 50 is fitted about and reflow solder connected to the outer capacitor terminal layers 51, 52 and 53. The tubular member 50 may have a slot 55 to facilitate the fitting or may alternatively be a solderable braid, screen or other suitable conductor. In any case, the conductors 45 and 50 form a coaxial leads structure for the paralleled capacitors assembly, which coaxial structure is well known in general for its excellent electrical characteristics over a wide spectrum of frequencies.

When, for a given voltage to be applied across the terminals of a capacitor of this invention, it is desired to reduce the voltage stress across the active dielectric layers, one or more additional annular concentric floating electrodes may be incorporated, a corresponding number of annular concentric electrodes also being added in the adjacent planes to provide a greater number of sub-capacitors in series between the inner and outer terminal layers.

What is claimed is:

1. A discoidal monolithic ceramic capacitor comprising a cylindrical ceramic dielectric body having a hole that is concentric with respect to the axis of said cylindrical body; and first, second and third sets of circularly annular metal film electrodes being buried in said body, each of said first and third set electrodes consisting of one less electrode than the number of said second set electrodes, said second set electrodes comprising at least two electrodes, said electrodes being arranged concentrically about said hole, said first and third set electrodes lying in a first and third plane, respectively, and said second set electrodes lying in a second plane that is parallel to and spaced from said first plane on one side and from second plane on the opposite side, said electrodes having increasingly greater outer diameters taken in order of their increasing outer positions relative to said hole, the innermost and the outermost electrodes extending to said hole and to the periphery of said cylindrical body, respectively, said first and third set electrodes extending radially less than to said hole and to said periphery, an area of overlapping existing between each second set electrode and an adjacent of said first and second set electrodes, said areas being substantially the same as that of each other overlapping adjacent pair of said electrodes.

2. The capacitor of claim 1, wherein said first set consists of two electrodes that are said innermost and said outermost electrodes, respectively, whereby said second set consists of one floating electrode.

3. The capacitor of claim 1, additionally comprising inner and outer metal termination layers being adhered to said periphery and to said hole, respectively, and contacting said outermost and said innermost electrodes, respectively.

4. A plurality of capacitors each according to claim 3 having equal outside diameters and being coaxially mounted, a common metal wire passing through said holes and contacting said inner termination layers, and a cylindrical metal sheet encompassing said plurality of capacitors and contacting said outer termination layers.

* * * * *